United States Patent [19]
Malinowski

[11] Patent Number: 4,949,296
[45] Date of Patent: Aug. 14, 1990

[54] METHOD AND APPARATUS FOR COMPUTING SQUARE ROOTS OF BINARY NUMBERS

[75] Inventor: Christopher W. Malinowski, Melbourne Beach, Fla.

[73] Assignee: Harris Corporation, Melbourne, Fla.

[21] Appl. No.: 195,265

[22] Filed: May 18, 1988

[51] Int. Cl.$^5$ .............................................. G06F 7/552
[52] U.S. Cl. .................................................. 364/752
[58] Field of Search ........................................ 364/752

[56] References Cited

U.S. PATENT DOCUMENTS

| | | | |
|---|---|---|---|
| 4,734,878 | 3/1988 | Sutcliffe | 364/752 |
| 4,757,467 | 7/1988 | Dieterich et al. | 364/752 |

OTHER PUBLICATIONS

Ramamoothy et al., "Some Properties of Iterative Square-Rooting Methods Using High-Speed Multiplication", *IEEE Trans. on Computers*, vol. C21, #8, Aug. 1972.

Primary Examiner—Dale M. Shaw
Attorney, Agent, or Firm—Barnes & Thornburg

[57] ABSTRACT

A square root is calculated by performing a plurality of iterations of the following:

$$X(n+1) = X(0) + X(n) * X(n) * 2^{-0.5*max-1}$$

wherein $X(0)$ is the seed value, max is the weight of the most significant bit of the smallest perfect binary square higher than the most significant bit of the operand A and calculating the square root R as follows:

$$R = 2^{0.5*max} - X(\text{last})$$

The seed value, or $X(0)$ is calculated as follows:

$$x(0) = (2^{max} - A) * 2^{-0.5*max-1}$$

To increase the accuracy and reduce the error, the operand can be initially upscaled and then downscaled in the final operation.

9 Claims, 2 Drawing Sheets

METHOD AND APPARATUS FOR COMPUTING SQUARE ROOTS OF BINARY NUMBERS

BACKGROUND AND SUMMARY OF THE INVENTION

The present invention relates generally to calculators for computing square roots of numbers and more specifically to an improved method and calculator for taking square roots of binary numbers The ability to perform fast square root extraction of binary numbers is crucial to the speed performance of many Digital Signal Processors (DSP), image and graphics processing circuits, where vector and matrix operations, complex number computations and coordinate conversions frequently need to take place. Typical examples of such systems are Sobel Edge Detection processors commonly used in radar signal processing, image recognition and target tracking systems. Another class of operations is rasterizing systems converting Cartesian coordinates to radial coordinates, DSP power spectrum analyzers and digital correlators and cross-correlators.

In general, three classes of algorithms for calculation of square roots are currently in use: (a) subtractive algorithms; (b) multiplicative algorithms; and (c) divisive algorithms. The (b) and (c) type algorithms are frequently used in conjunction with look-up tables serving to speed up the execution of the algorithm by providing a more accurate seed for algorithm's iterative process.

The subtractive algorithms are primarily used for hardware-based square root extraction circuits since they lend themselves best to the iterative trial-and-error root extraction. They are quite similar to the restoring division algorithms, and typically require N+2 steps to calculate an integer square root of an N-bit unsigned or positive integer. Thus, in a simple implementation, only a perfect square approximation of the square root and a remainder are provided, rather than a fixed or floating point full precision result. Full precision fractional results can also be obtained using this method at the expense of additional approximation steps.

Another class of algorithms, called multiplicative algorithms, is used to perform a full precision fractional and floating point square rooting. These algorithms are based either on Newton-Raphson approximation formula, or several series expansion formulas (such as Taylor series). Because of Newton-Raphson method's rapid convergence (i.e., the least number of iterations required to achieve desired precision compared to other known methods), it is the most common approach to fast computation of binary square root. The formula:

$$X(n+1)=0.5*X(n)*[3-A*X(n)*X(n)] \quad (1)$$

produces a 16-bit precision square root of A in approximately four iterations. However, it requires four multiplications, one subtraction and one shift per iteration, thus totalling 16 multiplication steps per 16-bit result plus overhead required to determine the seed value X(0).

Other multiplicative methods based on series expansion also require sixteen or more iteration steps before desired precision is attained and almost always call for the use of coefficient look-up tables to speed up the computational process.

The divisive algorithms are based on the original Newton-Raphson approximation formula:

$$X(n+1)=0.5*[X(n)+A/X(n)] \quad (2)$$

Because of the need to perform division for each iteration step, however, this algorithm is used for software-based square root computations, where the division consumes approximately the same number of steps as multiplication.

The duration of execution of most square root algorithms for a given precision of the result (except for series expansion based ones) is directly related to the precision of the starting estimate of the square root X(0). Depending on the accuracy with which the algorithm determines the beginning value of the X(0) (called a "seed" value), the algorithm will require lower or higher number of iterations to arrive at the result with a desired precision. Because of this, Newton-Raphson based algorithms often rely upon look-up tables to determine more accurate seed values X(0) before the iterative process is started. The use of look-up tables, however has its drawbacks, such as the need for large on-chip ROMs and an extra overhead involved in look-up. Thus, it is used only for high precision (such as 32-bit and greater) square root computations, where the look-up overhead is small compared to the iteration time saved.

Thus, it is an object of the present invention to provide a method of calculating square roots which offers significant speed advantage over those currently in use both for software and hardware based square root calculations by reducing the number of iterations required to attain desired precision of the result.

Another object of the present invention is to provide an increased speed over prior art square root calculations with a resulting precision equal to that of the initial operand.

A still even further object of the present invention is to provide a square root calculator and method which can take integer square roots as well as fraction floating point square root operations with equal precision.

A still even further object of the present invention is to provide a square root calculator which is suitable for implementation by double multiplier arrays.

These and other objects are achieved by performing a plurality of iterations of the following:

$$X(n+1)=X(0)+X(n)*X(n)*2^{-0.5*max-1}$$

where X(0) is the seed value, max is the weight of the most significant bit of the smallest perfect binary square higher than the most significant bit of the operand A. The square root R is then calculated as follows:

$$R=2^{0.5*max}-X(\text{last})$$

The seed value, or X(0) is calculated as follows:

$$X(0)=(2^{max}-A)*2^{-0.5*max-1}$$

To reduce the number of iterations required, the operand can be initially upscaled and then downscaled in the final operation. The equations above thus become:

$$X(0)=(2^{MAX}-A*2^L)*2^{-0.5*MAX-1}$$

$$X(n+1)=X(0)+X(n)*X(n)*2^{-0.5*MAX-1}$$

$$R = (2^{0.5*MAX} - X(\text{last}))*S$$

where:
MAX = maximum binary width of the input operations (e.g., 16 or 32 bit precision);
L = exponent of the initial upscaling factor, i.e., number of leading zeroes in the input operand A; and
S = final downscaling factor equal to $2^{-0.5*L}$ Application of these formulas will result in obtaining a full 16-bit precision of the result in only 6 iteration steps for a 16-bit binary number.

A calculator to perform the method in addition to a software implementation includes a seed calculator, a scaling factor circuitry, iteration circuitry, output format adjuster and iteration sequencer and control logic. These circuits use multiplexers, shifters, registers, multiplier arrays, adders, subtractors and two's complements.

Other objects, advantages and novel features of the present invention will become apparent from the following detailed description of the invention when considered in conjunction with the accompanying drawings.

DETAILED DESCRIPTION OF THE DRAWINGS

Figure 1:
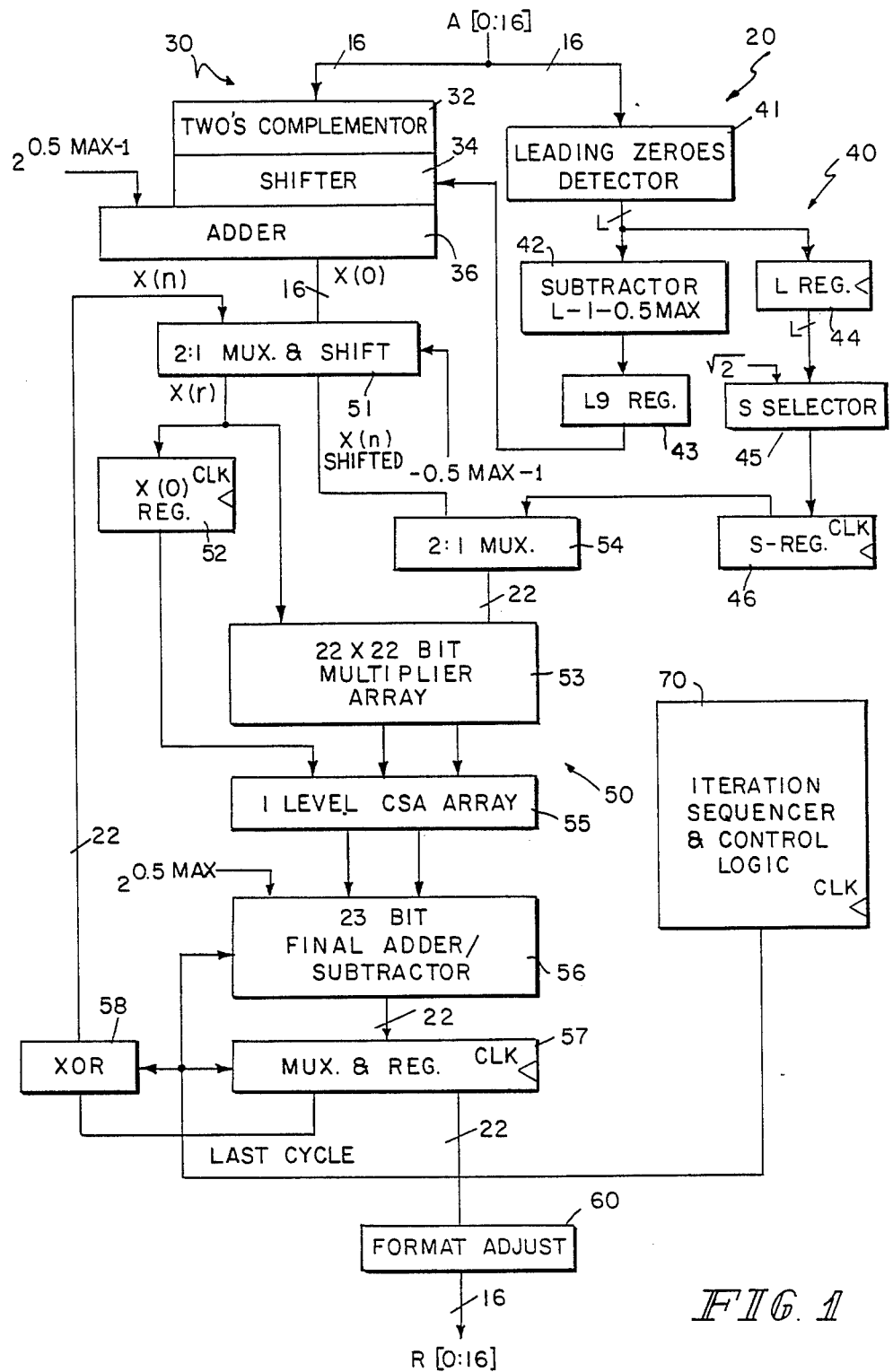
FIG. 1 is a block diagram of a calculator for taking the square root of a 16-bit operand incorporating the principles of the present invention.

The present invention is based on the iterative formula to derive, for example, a 16-bit square root of a 16-bit number with six iteration steps with an extra correction step required at the end of the iteration process. Thus, even in its simplest implementation, it is two or three times faster than the modified Newton-Raphson algorithm (1). Moreover, because of its simple flow (i.e., fewer incongruence of the single iteration step) it is well suited for double multiplier array implementation, which allows for a further increase in speed of its execution.

The fundamental source of the algorithm's quick convergence is its ability to determine a high precision seed of the result very quickly in the first step of the iteration. The seed of the root is determined based on the old theorem of number theory, stating that the square of an integer is equal to the sum of K consecutive odd integers, where K is the square root of the integer. For instance, if the initial integer to be square rooted is 25, the sum of all odd numbers: $1+3+5+7+9=25$, and the number of the odd integers summed is 5.

Based on this theorem, the following iteration formula for the square root R of an integer A has been arrived at:

$$X(n+1) = X(0) + X(n)*X(n)*2^{-0.5*max-1} \quad (3)$$

$$R = 2^{0.5*max} - X(\text{last}) \quad (4)$$

with the seed value X(0) defined as:

$$X(0) = (2^{max} - A)*2^{-0.5*max-1} \quad (5)$$

where max is the weight of the most significant bit of the smallest perfect binary square higher than the most significant bit of the operand A. Perfect binary square bits are the values such as 1, 4, 16, 64, etc., for which perfect binary square roots 1, 2, 4, 8 exist. For example, if A = 71, the value of max is 8, since the nearest perfect binary square is 256.

The expression (3) in its raw form calls for a single addition, multiplication and arithmetic right shift for one iteration cycle, a set of operations simpler than that required by Newton-Raphson method. Also, the determination of the seed value X(0) can be performed quickly, since it only involves a bounded two's complement of the operand and a single arithmetic shift. In its unmodified form, however, formula (3) calls for eleven iteration steps, a performance better than the other algorithms, but still subject to further improvement.

A significant reduction in the number of iteration steps required to attain 16-bit precision of the result can be accomplished by modifying formula (3) to perform the iteration within the upper range of the 16-bit numeric scale, i.e., by continuous upscaling of the operand A to stay within the $2^{15}$ to $2^{16}$ range. Since the relative error increases geometrically with the distance of A from $2^{max}$, upscaling the operand A to the $2^{15}$ to $2^{16}$ range double the precision of the iteration. In other words, it halves the number of iteration steps for a given precision required. The expressions for modified square root iteration are:

$$X(0) = (2^{MAX} - A*2^L)*2^{-0.5*MAX-1} \quad (6)$$

$$X(n+1) = X(0) + X(n)*X(n)*2^{-0.5*MAX-1} \quad (7)$$

$$R = (2^{0.5*MAX} - X(\text{last}))*S \quad (8)$$

where:
MAX = maximum binary width of the input operations (e.g., 16 or 32 bit precision);
L = exponent of the initial upscaling factor, i.e., number of leading zeroes in the input operand A; and
S = final downscaling factor.

In the physical implementation of equation (8), the downscale factor is difficult to implement where L is an odd number since it involves the square root of 2. Thus, the downscale factor S will be expressed as follows:

$S = 2^{-0.5*L}$ if L is even, or $S = 2^{-0.5*(L+1)}*\text{sqrt}(2)$ if L is odd.

The only extra overhead involved in the modification of equations (6) through (8) over those of equations (3) through (5) is the necessity to perform an additional multiplication by a hardwired value of a square root of 2 in a final step of the iteration when the weight of the A's in the MSB is odd. The formulas (6) through (8) allow attaining 16-bit precision fractional results within six iteration steps with an extra step (8) required for downscaling the final result.

These formulas (6), (7) and (8) allow the design of very fast circuits capable of performing all even roots of binary integers within 3.5*M iteration steps (where M is the order of the root) and odd roots within 3.5*M+1 iteration steps for 16-bit precision computations. Hardware implementation of the algorithm in the most basic form consists of a 16×16-bit multiplier, leading zero detection logic, pre- and post-normalization logic (shifters), data path multiplexers and control logic illustrated in FIG. 1. The execution of the modified algorithm is relatively straightforward if the result is to be delivered in a non-normalized floating point format. Representing the output data in one of the industry standard floating point formats would require additional normalization logic and exponent ALU.

In order to maintain the full 16-bit precision, the internal precision of the computations is 22 bits to make up for the precision loss associated with the arithmetic left shifts and partial result rounding. Only during the last cycle, final rounding to 16 significant places is performed.

It should be noted that in a practical implementation the circuitry shown would be shared with other closely related arithmetic operations such as binary division, multiplication and ALU operations.

The square root calculator 20 of FIG. 1 includes seed calculator 30, scaling factor circuit 40, iteration circuit 50, output format adjuster 60 and iteration sequencer and control logic (ISCL) 70. Seed calculator 30 calculates the seed X(0) according to equation (6). The scaling factor circuit 40 provides the upscaling factor L and the downscaling factor S to be used in the seed calculator and the root calculation portion. The iteration circuit performs multiple iterations of equation (7), as well as calculating the root using equation (8). Format adjuster 60 provides the appropriate output formatting. Although the portions of the calculator 20 are under the control of the ISCL 70, a majority of the control signals from the ISCL to the other circuits are not shown in the drawing for the sake of clarity.

The seed calculator 30 includes a two's complementation circuit 32, a shifter 34 and an adder 36. In the specific implementation of FIG. 1, the seed calculation circuit modifies equation (6) as indicated in (6'):

$$X_0 = 2^{0.5*MAX-1} - A*2^{L-1-0.5*MAX} \qquad (6')$$

Two's complementer 32 takes the complement of the operand A and provides it to shifter 34 where it is shifted $L-1-0.5*MAX$. As is well known, to multiply a number times two to the exponent in binary is to shift that number by the exponent number of places. The two's complement of the shifted operand is then added in the adder 36 to $2^{0.5*MAX-1}$, which is inputted by hardwire connection.

The scaling circuit 40 includes a leading zero detector 41 which determines the number of leading zeros in the input operand A which is represented by L in equations (6) and (7). The exponent for the power of two for the operand A in equation (6) is determined in subtractor 42. $1+0.5MAX$ is subtracted from L in subtractor 42. The result is provided in L9 register 43 and is provided as an input to shifter 34 of the seed calculator 30. In the example of a 16-bit operand, MAX is 16 therefore, $1-0.5MAX$ is 9. Thus, subtractor 42 performs $L-9$. The value L from the leading zero detector 41 is also provided to an L register 44. The output of L register 44 is provided to the downscaling factor S selector 45. If L is an even number, S selector 45 provides $2^{-0.5*L}$ to the S register 46. If L is an odd number, the S detector provides $2^{-0.5*(L+1)}*sqrt(2)$ to the S register 46. One of the inputs to the S selector is a hardwire value for the square root of 2. The downscale register 46 is provided as an input to the multiplexer 54 of iteration circuit 50.

Iteration circuit 50 includes a multiplex shifter 51 which receives at a first input the seed value X(0) from the seed calculator 30 and a feedback signal X(n) at a second input. The multiplixer-shifter 51 receives a shift signal $-0.5*MAX-1$ which is required by equation (7). The multiplixer-shifter 51 provides the selected input value at a first output which is connected to the X(0) register 52 and to the multiplier array 53 and a shifted selected input value at a second output which is connected to multiplier 54. The multiplexer 54 selects between the inputs from the multiplexer shifter 51 and the S register 46 to provide the other input to the multiplier array 53. The output of multiplier array 53 is provided and added to the X(0) from X(0) register 52 in a one-level carry-save adder array 55. The carry and save from carry-save adder array 55 is provided to a final adder/subtractor 56 which provides a binary number of X(n+1) of formula 7. The output of the final adder 56 is provided to a multiplexer and register 57 whose output may be selectively provided to the final format adjuster 60 or to the exclusive O-gate 58 to be fed back as the input X(n) of the multiplexer shifter 51.

The ISCL 70 provides appropriate clock signals to the individual registers, control signals to multiplexer 51, 54 and 57, last cycle signal to exclusive OR-gate 58, multiplexer 57 and final adder/subtractor 56 and a control signal to S selector 45. The ISCL 70 begins the process by calculating the seed value X(0) in seed value calculator 30 and simultaneously calculating the upscaling and downscaling factors in scaling factor circuit 40. Seed value X(0), provided to multiplexer shifter 51, is selected to be provided as the first output and stored in the X(0) register 52 as well as being provided to one of the inputs of the multiplier array 53. The upscale factor L and the downscale factor S are provided in L9 register 43 and S register 46. X(0) is provided on the second output of multiplexer shifter 51 shifted by $-0.5*MAX-1$ and provided by an input to multiplexer 54. The shifted X(0) value is selected as the output of multiplexer 54 and is the second output to the multiplier array 53. The value of X(0) times the shifted X(0) in multiplier 53 is added to X(0) in the carry-save adder array 55. The output is provided to adder 56 where the sum and carry are added and transmitted through multiplexer 56 to the feedback circuit through OR-gate 58 on the second input to multiplexer shifter 51. The value X(1) on the second input is provided by multiplexer-shifter 51 directly to multiplexer 53 on one output and is shifted by $-0.5*MAX-1$ to multiplexer 54 where it is selected and provided as a second input to multiplier array 53. This is the described iteration path.

Once the last iteration is determined by the ISCL 70, a last cycle signal is provided to the final adder/subtractor 56 to the multiplexer and register 57 and to the exclusive OR-gate 58. In the last cycle, X(last) is subtracted from $2^{0.5*MAX}$ which is provided as a hardwired value and fed back through multiplexer register 57 and exclusive OR-gate 58 to the multiplexer-shifter 51. This value is provided at the first unshifter output of multiplexer shifter 51 directly to the multiplier array 53. The S register downscale factor 46 is continuously provided to multiplexer 54 which now selectively provides the downscaling factor to the multiplier array 53. The multiplier array 53 then provides the results to the carry-save array 55 where it is added without X(0) and provided to the final adder 56. The output of the final adder 56 is provided to multiplexer register 57 where it is clocked into the register and provided to the format adjuster circuit 60. Depending upon the desired format of the output, the format adjuster 60 adjusts the format of the root R which has been calculated according to equation (8).

Figure 2:
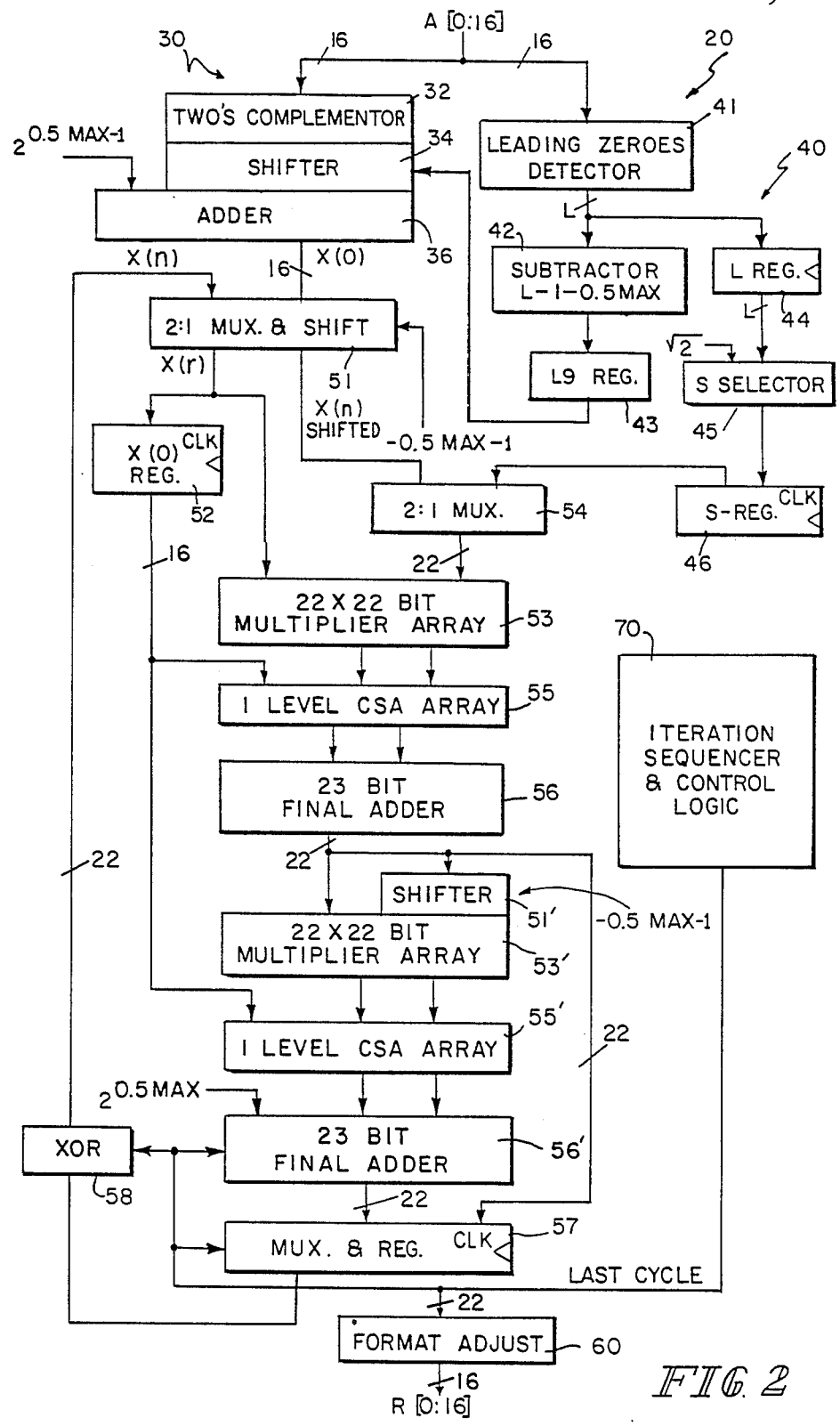
FIG. 2 is a block diagram of a square root calculator for taking the square root of a 16-bit operand having a double multiplier array also incorporating the principles of the present invention.

It may be desirable to perform a double-step iteration within a single cycle of execution. This can be accomplished by utilizing a dedicated double-multiply array as illustrated in FIG. 2. Although the latency of such circuit is longer than that shown in FIG. 1, the execution of 16-bit square root can be accomplished here within four clock cycles rather than seven.

In FIG. 2, the second multiplier array 53', carry-save adder array 55' and final adder 56' are shown following the first multiplier array 53, carry-save adder array 55 and final adder 56. The single output from final adder 56 is provided directly as an unshifted input to the multiplier 53' and is also provided indirectly as a shifted input to multipliers 53' through shifter 51'. With respect to all other aspects, the square root calculator of FIG. 2 is identical to that of FIG. 1.

Although the present invention has been described as a binary square root calculator, the present principles, formulas and algorithms are also applicable to higher order roots, as well as being operable in the decimal or any other system. Although the method has been shown as implemented in hardware, it may also be implemented in software or firmware. It is to be clearly understood that this description is by way of illustration and example only, and is not to be taken by way of limitation. The spirit and scope of the present invention are to be limited only by the terms of the appended claims.

What is claimed:

1. A binary number square root calculator comprising:
   input means for receiving a N-bit operand A;
   seed means connected to said input means for determining a seed value X(0) of n bits from said operand A as follows:

$$X(0) = (2^{max} - A) * 2^{-0.5max - 1};$$

said seed means including: a complementer means for complementing said operand A; shifter means for shifting said complemented operand $-A$ by $-0.5*max - 1$; and adder means for adding $2^{0.5*max - 1}$ to a shifted complemented operand $-A$;
   iteration means connected to said seed means for performing a plurality of iterations of the following:

$$X(n+1) = X(0) + X(n) * X(n) * 2^{-0.5max - 1}$$

where max is the weight of the most significant bit of the smallest perfect binary square higher than the most significant bit of operand A; and
   root means connected to said iteration means for determining a last iteration and calculating a square root of the operand A from the results of the last iteration X(last) of the iteration means as follows:

$$R = 2^{0.5*max} - X(last).$$

2. A binary number square root calculator comprising:
   input means for receiving an N-bit operand A;
   seed means connected to said input means for determining a seed value X(0) of n bits from said operand A;
   iteration means connected to said seed means for performing a plurality of iterations of the following:

$$X(n+1) = X(0) + X(n) * X(n) * 2^{-0.5max - 1}$$

where max is the weight of the most significant bit of the smallest perfect binary square higher than the most significant bit of operand A;
   said iteration means including: multiplexer-shifter means for providing a shifted and non-shifted output of a selected first or second input, said shifter output being shifted by $-0.5*max - 1$; multiplier means for multiplying said shifted and non-shifted outputs to produce a product; adder means for adding said seed value X(0) to said product; and feedback means for feeding back an output of said adder means to said second input of said multiplexer-shifter means;
   said seed means being connected to said first input of said multiplexer-shifter means; and
   root means connected to said iteration means for determining a last iteration and calculating a square root of the operand A from the results of the last iteration X(last) of the iteration means as follows:

$$R = 2^{0.5*max} - X(last).$$

3. A binary number square root calculator comprising:
   input means for receiving a N-bit operand A of maximum binary width of MAX;
   scaling means for determining an upscaling factor L and a downscaling factor S as a function of the operand bit width N;
   seed means connected to said input means for determining a seed value X(0) of n bits from said operand A as follows:

$$X(0) = (2^{MAX} - A * 2^L) * 2^{-0.5MAX - 1};$$

said seed means including: a complementer means for complementing said operand A; shifter means for shifting said complemented operand $-A$ by $L - 0.5*MAX - 1$; aand adder means for adding $2^{0.5*MAX - 1}$ to a shifted complemented operand $-A$;
   iteration means connected to said seed means for performing a plurality of iterations of the following:

$$X(n+1) = X(0) + X(n) * X(n) * 2^{-0.5MAX - 1};$$ and root means connected to said iteration means for determining a last iteration and calculating a square root of the operand A from the results of the last iteration X(last) of the iteration means as follows:

$$R = (2^{0.5*MAX} - X(last)) * S.$$

4. A binary number square root calculator according to claim 3, wherein said scaling means determines said upscaling factors L as the difference between MAX and the weight of the most significant bit of the operand A and determines said downscaling factor S as $2^{0.5L}$.

5. A binary number square root calculator according to claim 3 wherein said root means includes a means to modify said iteration means to calculate said square root R.

6. A binary number square root calculator comprising:

input means for receiving an N-bit operand A of maximum binary width of MAX;

scaling means for determining an upscaling factor L and a downscaling factor S as a function of the operand bit width N;

seed means connected to said input means for determining a seed value X(0) of n bits from said operand A as follows:

$$X(0)=(2^{MAX}-A*2^L)*2^{-0.5MAX-1};$$

iteration means connected to said seed means for performing a plurality of iterations of the following:

$$X(n+1)=X(0)+X(n)*X(n)*2^{-0.5MAX-1}$$

said iteration means including: multiplexer-shifter means for providing a shifted and non-shifted output of a selected first or second input, said shifter output being shifted by $-0.5*MAX-1$; multiplier means for multiplying said shifted and non-shifted outputs to produce a product; adder means for adding said seed value X(0) to said product; and feedback means for feeding back an output of said adder means to said second input of said multiplexer-shifter means;

said seed means being connected to said first input of said multiplexer-shifter means; and root means connected to said iteration means for determining a last iteration and calculating a square root of the operand A from the results of the last iteration X(last) of the iteration means as follows:

$$R=(2^{0.5*MAX}-X(\text{last}))*S.$$

7. A binary number square root calculator according to claim 6, wherein said iteration means further includes a multiplexer means for selecting from a first input of said shifted output of said multiplexer-shifter or a second input of said downscaling factors to provide an output as an input to be multiplied in said multiplier means with said nonshifted output of said multiplexer-shifter means to calculate said square root R.

8. A binary number square root calculator according to claim 7, wherein said adder means includes an input $2^{0.5*MAX}$ to be added to $-X(\text{last})$ for calculating said square root R.

9. A binary number square root calculator according to claim 6, wherein said iteration means further includes:

a second shifter means for shifting outputs of said adder means by $-0.5*MAX-1$;

second multiplier means for multiplying said output of said multiplier means and an output of said second shifter means to produce a second product;

second adder means for adding said seed value X(0) to said second product; and wherein said feedback means feeds back output of said second adder means to said multiplex-shifter means.

* * * * *